V. HIMMER.
Improvement in Electric Battery.
No. 119,763.  Patented Oct. 10, 1871.
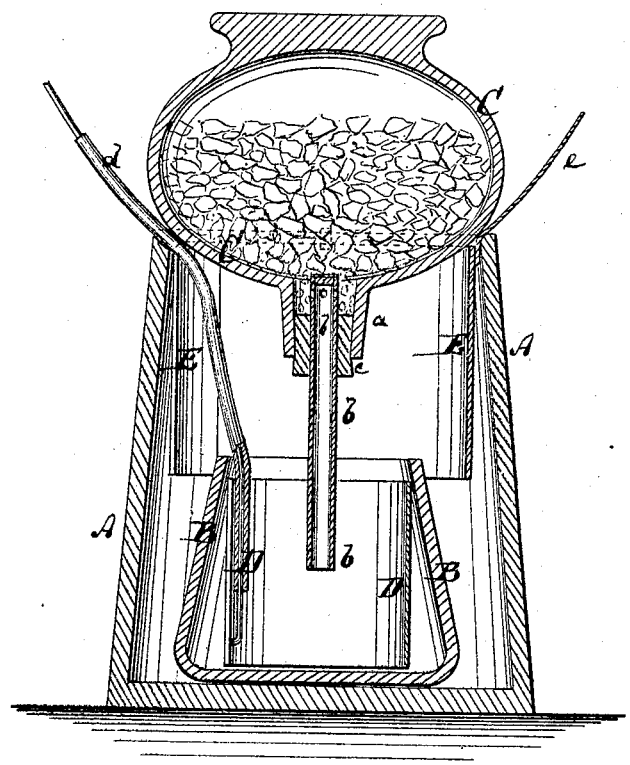
Witnesses:
A. Bennecendorf.
Francis McArdle.
Inventor:
V. Himmer
per Munn & Co.
Attorneys.

UNITED STATES PATENT OFFICE.

VITALIS HIMMER, OF NEW YORK, N. Y.

IMPROVEMENT IN ELECTRIC BATTERIES.

Specification forming part of Letters Patent No. 119,763, dated October 10, 1871.

*To all whom it may concern:*

Be it known that I, VITALIS HIMMER, of the city of New York, in the county and State of New York, have invented a new and Improved Electric Battery; and I do hereby declare that the following is a full, clear, and exact description thereof, which will enable others skilled in the art to make and use the same, reference being had to the accompanying drawing forming part of this specification.

The drawing represents a vertical central section of my improved electric battery.

This invention relates to a new electric battery, which is so arranged that its power can be regulated at will, and that a supply of its source of power can be attached to it to keep it operative for a suitable length of time. The invention consists, principally, in the application to the battery-cup of an inverted covering-vessel, which contains sulphate of copper, and has a pendent pipe dipping into the holder of the copper element. The depth to which said pipe is immersed in the copper regulates the strength of the battery. The pipe is therefore made up-and-down adjustable in the covering-vessel.

A in the drawing represents the battery-cup, made of glass or other suitable material, of suitable form and size. B is a small vessel of truncated conical form, placed upon the bottom of the vessel A. C is a vessel of suitable size and shape, filled with sulphate of copper and water, and provided with a neck, *a*, through which a small tube, *b*, is fitted. This tube *b* is preferably held in a cork, *c*, as shown, in which it may be shifted up and down and still held secure. The vessel C is in an inverted position, placed upon the cup A so that the tube *b* enters the pot B to a greater or less depth. D is the copper element of the battery, placed into the pot B and connected with the conductor *d*. E is the zinc element of the battery, placed within the upper part of the cup A and held there by its own spring pressure. *e* is the conductor leading from the zinc.

The cup A is filled with salt or other water, and also the vessel C. The latter is then in an inverted position placed over the cup, as shown, its tube *b* entering the pot B. The upper end of the tube is preferably closed and small perforations cut near the top through it, so that they will not be liable to become clogged by pieces of sulphate of copper. The water in C will gradually dissolve the sulphate of copper, the solution flowing into B, where, on account of balanced pressure, it will rise no higher than the lower end of the tube *b*. That amount of surface of copper D which is in actual contact with the above-named solution will be active in the battery, but not the remainder. The depth to which the tube *b* is immersed, and the consequent height in B of the sulphate-of-copper solution determine, therefore, the strength of the battery. The zinc will, by the contact with the water, always be ready for action, the spent zinc dropping to the bottom of A, but clear of B. When the battery is active the solution in B will be gradually absorbed and a new supply constantly drawn from C in such exact ratio as is necessary to provide the active effectiveness of the battery. When the battery is not used there will be no displacement of parts within the cup A or vessel C. The latter may be secured upon the cup in such manner as to secure it air-tight, in which case evaporation is absolutely prevented. A battery of this kind can be kept in effective operation continuously for years, without requiring the least addition or replacement of parts, provided the pieces D E are of sufficient size and the vessel C large enough to hold the requisite amount of the sulphate of copper.

Having thus described my invention, I claim as new and desire to secure by Letters Patent—

1. The inverted vessel C, having the pendent tube *b*, and applied as a cover to the cup of an electric battery, substantially as herein shown and described.

2. The electric battery composed of the cup A, pot B, inverted vessel C, pipe *b*, and elements D E, all arranged substantially as herein shown and described.

3. The tube *b*, supplying the exciting solution to the copper-plate of a battery, made lengthwise adjustable to regulate the strength of the battery, substantially as herein shown and described.

VITALIS HIMMER.

Witnesses:
A. V. BRIESEN,
T. B. MOSHER. (50)